United States Patent
Pitwon et al.

(10) Patent No.: US 10,164,709 B2
(45) Date of Patent: Dec. 25, 2018

(54) OPTICAL DATA COMMUNICATION OVER VARIABLE DISTANCES

(71) Applicant: Seagate Technology LLC, Cupertino, CA (US)

(72) Inventors: Richard C. A. Pitwon, Fareham (GB); David Michael Davis, Portsmouth (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/481,965

(22) Filed: Apr. 7, 2017

(65) Prior Publication Data
US 2018/0294878 A1    Oct. 11, 2018

(51) Int. Cl.
*H04B 10/114* (2013.01)
*H04B 10/80* (2013.01)
(Continued)

(52) U.S. Cl.
CPC ....... *H04B 10/1143* (2013.01); *G02B 19/009* (2013.01); *G02B 19/0052* (2013.01);
(Continued)

(58) Field of Classification Search
CPC ..................................... H04B 10/114–10/116
See application file for complete search history.

(56) References Cited

U.S. PATENT DOCUMENTS

| | | |
|---|---|---|
| 9,235,020 B2 | 1/2016 | Pitwon |
| 2009/0097856 A1* | 4/2009 | Sasai ................. H04B 10/1141 398/119 |

(Continued)

FOREIGN PATENT DOCUMENTS

| | | |
|---|---|---|
| EP | 3 007 370 A1 | 4/2016 |
| KR | 101202669 B1 | 11/2012 |

OTHER PUBLICATIONS

Dimitrov, et al., *Principles of LED Light Communications: Towards Networked Li-Fi*, Cambridge University Press, Cambridge, United Kingdom, 2015. Cover page, title page, and table of contents. 6 pages (indicates number of pages being submitted, not length of book). Appears to be available at <http://s1.nonlinear.ir/epublish/book/Principles_of_LED_Light_Communications_Towards_Networked_LiFi_1107049423.pdf> (Last viewed on Apr. 7, 2017).

*Primary Examiner* — Shi K Li

(74) *Attorney, Agent, or Firm* — Mueting, Raasch & Gebhardt, P.A.

(57) ABSTRACT

A system includes a first optical communication interface and a second optical communication interface optically coupled via a free-space communication channel. The interfaces are spaced at variable distances. Each interface includes an optical source to provide a beam of electromagnetic energy and an optical receiver to receive the beam to bi-directionally communicate with the other interface via the channel. The first optical communication interface may be coupled to a sub-chassis. The second optical communication interface may be coupled to a device frame. The device frame may be movably coupled to the chassis. Communication may utilize multi-input, multi-output processing configured by a calibration matrix. A shutter may be positioned to receive the beam or be positioned clear of the beam depending on the distance between the interfaces.

19 Claims, 12 Drawing Sheets

(51) Int. Cl.
    *G02B 26/04*    (2006.01)
    *G02B 19/00*    (2006.01)
(52) U.S. Cl.
    CPC ..... *G02B 19/0061* (2013.01); *G02B 19/0076* (2013.01); *G02B 26/04* (2013.01); *H04B 10/807* (2013.01)

(56)  References Cited

U.S. PATENT DOCUMENTS

2012/0099868 A1*   4/2012   Fischer .............. H04B 10/1127
                                                        398/115
2012/0275795 A1*  11/2012   Chan ................. H04B 10/1149
                                                        398/128
2013/0126713 A1    5/2013   Haas et al.
2016/0308615 A1   10/2016   Videv et al.
2017/0045703 A1    2/2017   Pitwon

* cited by examiner

OPTICAL DATA COMMUNICATION OVER VARIABLE DISTANCES

The present disclosure relates to optical data communication over variable distance and, in particular, relates to optical data communication for data management systems including movable devices and optical interfaces for communicating with the devices across a free-space communication channel.

SUMMARY

The example systems, apparatuses, and methods described herein relate to optical data communication between devices that may be movable with respect to one another. In some embodiments of the present disclosure, a communication system includes a first optical communication interface and a second optical communication interface movable relative to the first optical communication interface. The interfaces can bi-directionally communicate with one another across a variable distance via a free-space communication channel.

Various aspects of the present disclosure relate to a system including a first optical communication interface coupled to a sub-chassis, a free-space communication channel optically coupled to the first optical communication interface, and a second optical communication interface coupled to a device frame. The device frame is movably coupled to the sub-chassis. The second optical communication interface is optically coupled to the first optical communication interface via the channel to bi-directionally communicate across a variable distance between the interfaces.

Various aspects of the present disclosure relate to an apparatus including a first optical communication interface and a second optical communication interface. The interfaces define a free-space communication channel therebetween. Each interface includes an optical source of electromagnetic energy and an optical receiver of electromagnetic energy to bi-directionally communicate with the other interface via the channel using multi-input, multi-output processing configured by a calibration matrix.

Various aspects of the present disclosure relate to a system including a first optical communication interface and a second optical communication interface spaced at variable distances from the first optical communication interface. The variable distances include at least a first distance and a different second distance. The system also includes a shutter positioned to receive a beam of electromagnetic energy sourced by one of the interfaces in response to the interfaces spaced by the first distance and positioned clear of the beam in response to the interfaces spaced by the second distance.

It is to be understood that both the foregoing general description and the following detailed description present embodiments of the subject matter of the present disclosure, and are intended to provide an overview or framework for understanding the nature and character of the subject matter of the present disclosure as it is claimed.

BRIEF DESCRIPTION OF THE DRAWINGS

The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

Figure 1:
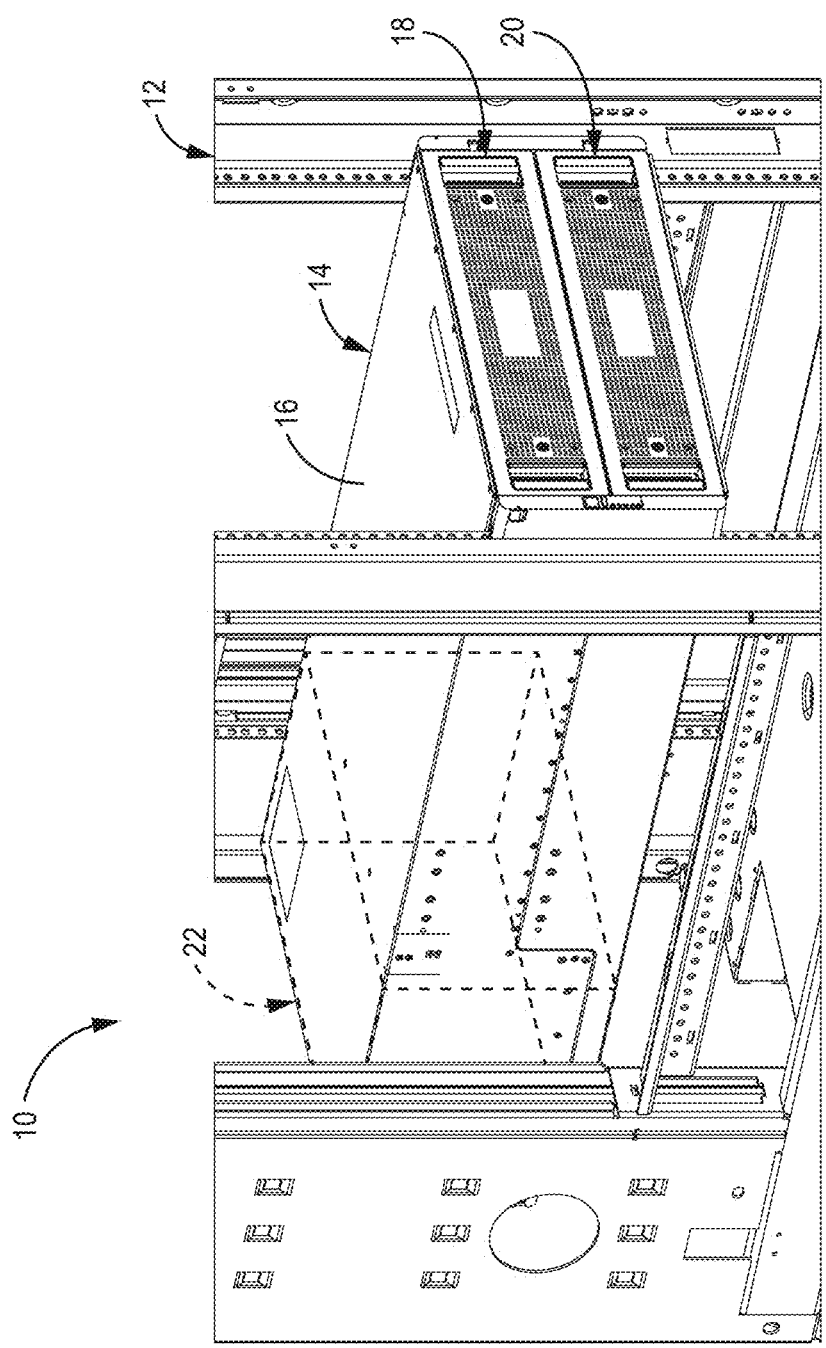
FIG. 1 is a front-perspective view of a data management system including a chassis with two device frames mounted.

In the following detailed description, reference is made to several specific embodiments. It is to be understood that other embodiments are contemplated and may be made without departing from the scope or spirit of the present disclosure. The following detailed description, therefore, is not to be taken in a limiting sense.

DETAILED DESCRIPTION

Data management systems may include storage devices and servers and may be connected to a network for convenient access. The popularity of cloud networks for the storage of data has increased the demand for higher storage densities while simultaneously improving access bandwidth to the data.

One desirable feature for data management systems is the ability to move a plurality of active devices (e.g., storage devices and/or servers) out of a chassis to swap, add, or remove active devices without interrupting access to such devices and/or one or more other components (e.g., a hot swap). In some systems, a chassis may include a sub-chassis and a drawer containing one or more active devices. The drawer may be slidably coupled to the sub-chassis or otherwise movably coupled thereto. To physically access active devices, the drawer may be pulled away, or out, from the sub-chassis, for example, when a device in the drawer needs maintenance. It would be desirable to develop a communication system that facilitates communication between active devices coupled to a device frame and may move relative to other devices that may be coupled to the sub-chassis and be stationary.

The present disclosure describes a communication system including a first optical communication interface and a second optical communication interface movable relative to the first optical communication interface. The interfaces can bi-directionally communicate with one another across a variable distance via a free-space communication channel. Various optical components or communication techniques can be used to provide robust communication between interfaces at a high bandwidth. The maximum bandwidth may be a higher than cable-only data communication utilizing a similar limited amount of space, particularly for data management systems with variable distances between some devices.

The present disclosure also describes that lenses can be used to facilitate misalignment tolerance between the optical sources and receivers of the interfaces. Alternatively, or in addition, multi-input, multi-output (MIMO) processing can be used to provide robust communication between interfaces to facilitate even greater misalignment tolerance than utilizing lenses alone. MIMO processing may use a calibration matrix that is calculated when the interfaces are detected as being stationary relative to one another. The type of optical data communication processing may be selected, or switched, depending on the distance between the interfaces. For example, the communication processing may switch to MIMO to enable robust communication at various distances and may switch to single-input, single-output (SISO) to reduce processing overhead and communication latency, as compared to MIMO.

Reference will now be made to the drawings, which depict one or more aspects described in this disclosure. However, it will be understood that other aspects not depicted in the drawings fall within the scope and spirit of this disclosure. Like numbers used in the figures refer to like components, steps and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

Figure 2:
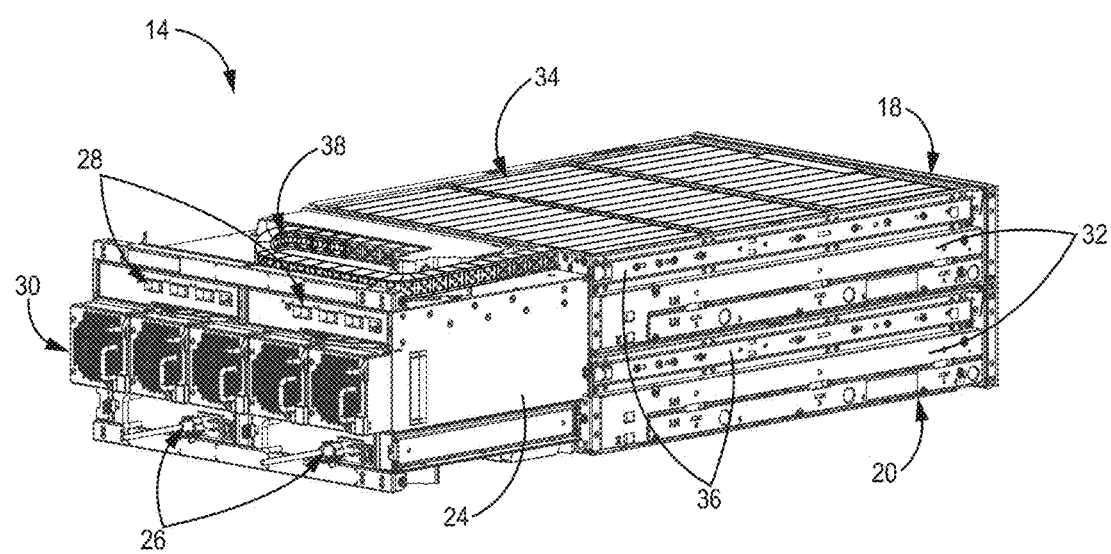
FIG. 2 is rear-perspective view of the chassis of FIG. 1 without a housing showing each device frame in a closed position.
Figure 3:
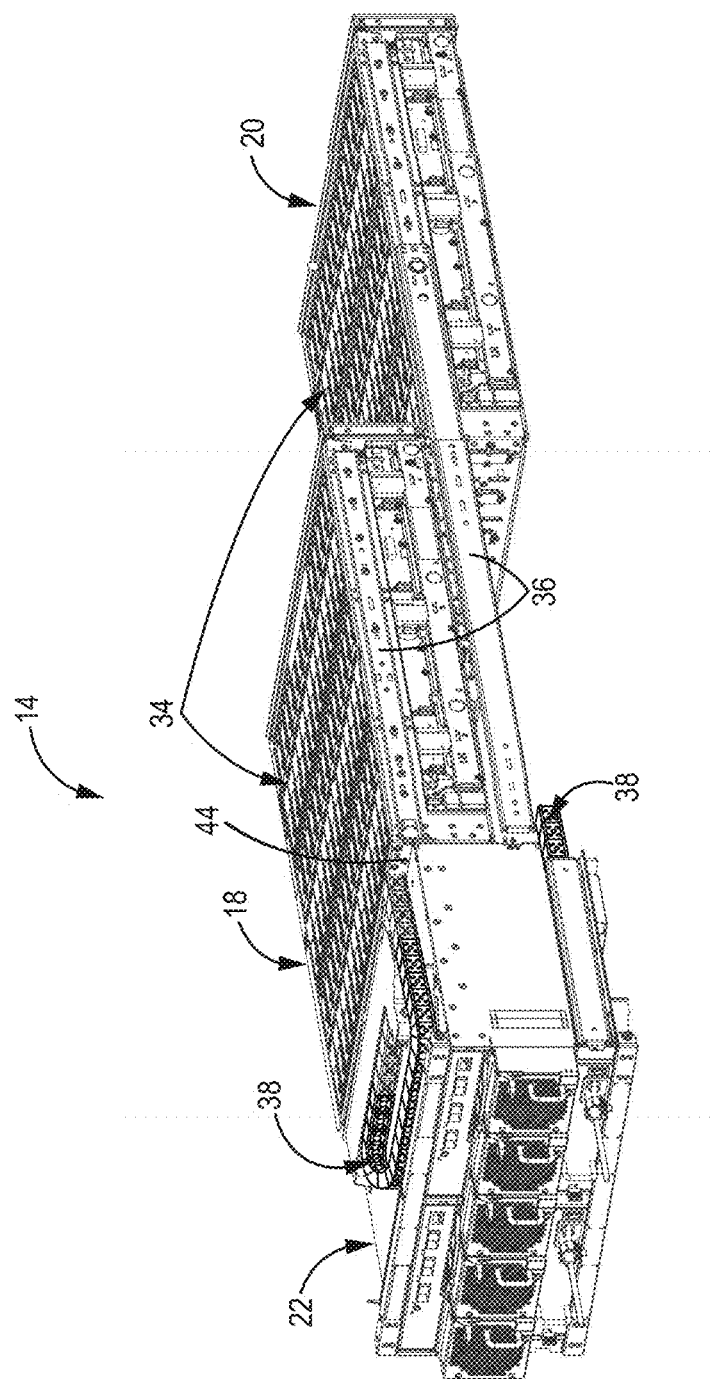
FIG. 3 is a rear-perspective view of the chassis of FIG. 1 without a housing showing one device frame in an open position and one device frame in a closed position.

FIGS. 1, 2, and 3 together show a data management system 10 including a rack 12 that maintains or supports a chassis 14. The rack 12 may be one of a plurality of racks in a data management system 10. Each rack 12 may occupy a portion of the floor space in a data center or data room, for example, and include one or more chassis 14.

Racks 12 may also be described as cabinets and, in some embodiments, include four metal posts that define a tall rectangular prism volume. In the illustrated embodiment, the chassis 14 is mounted to four posts of the rack 12. Although only one chassis 14 is shown for illustrative purposes, the rack 12 may be tall enough to mount two or more chassis 14 in a vertical stacking configuration.

The chassis 14 may include a housing 16 extending from a front portion to a rear portion of the chassis 14, a sub-chassis 22 disposed in the rear portion of the chassis 14, and one or more drawers 18, 20 disposed in the front portion of the chassis 14. The housing 16 may be coupled to the sub-chassis 22 and the drawers 18, 20. The housing 16 may be formed of sheet metal, for example. In some embodiments, the sub-chassis 22 is fixedly coupled to the housing 16, and the drawers 18, 20 are slidably coupled to the housing 16 and/or the sub-chassis 22.

The chassis 14 may be dimensioned according to standard sizes and define a limited amount of space for components. In at least one embodiment, the height of the chassis 14 is about 220 mm (5U), the width of the chassis 14 may be a standard width for a 19-inch rack (e.g., about 447 mm/about 17.6 inches), and the depth of the chassis 14 may about 900 mm.

The sub-chassis 22 may include a sub-chassis frame 24 that physically maintains or supports one or more power supplies 26 to provide electrical power to components of the chassis 14, one or more data controllers 28 to manage the flow of data and data requests for the chassis 14, and one or more fans 30 to provide cooling airflow to the components of the chassis 14. In some embodiments, the power supplies 26, data controllers 28, and fans 30 are fixedly coupled to the sub-chassis frame 24 and may be described as stationary.

In many data management systems 10, the sub-chassis 22 includes two or more power supplies 26, two or more data controllers 28, and two or more fans 30 to provide redundancy, which may allow for uninterrupted operation should a component fail. In the illustrated embodiment, for example, two power supplies 26, two data controllers 28, and five fans 30 are included.

Each data controller 28 may include a processor, such as a central processing unit (CPU), computer, logic array, or other device capable of directing data coming into or out of the chassis 14. In some embodiments, the data controller 28 includes one or more computing devices having memory, processing, and communication hardware. The functions of the data controller 28 may be performed by hardware and/or as computer instructions on a non-transient computer readable storage medium.

The drawers 18, 20 may each include a device frame 32 that physically maintains or supports one or more active devices 34 powered by the power supplies 26. In various embodiments, a plurality of active devices 34 are supported in each device frame 32. In some embodiments, the active devices 34 are operably coupled to each of the power supplies 26 and each of the data controllers 28 for redundancy.

In some embodiments, the active devices 34 may be servers, storage devices, or both. Storage devices may be hard disk drives, flash drives, solid state drives, or any other device suitable for storing data, for example. Servers may be application modules or any other compute modules, which may be structured to functionally execute the operations of the server, for example. Modules may be implemented in hardware and/or as computer instructions on a non-transient computer readable storage medium, and modules may be distributed across various hardware or computer-based components.

In some embodiments, the chassis 14 may include, disposed in each device frame 32, at least 14 active devices, at least 28 active devices, at least 42 active devices, or more. In some embodiments, the chassis 14 includes at least 84 active devices, which may be arranged as 42 active devices per drawer (e.g., 3 rows of 14 bays), which may be equal to about 16.8 active devices per U in device density. In one example, the chassis 14 can achieve a data bandwidth of about 7 Gigabytes per second, about 14 Gigabytes per second, about 21 Gigabytes per second, or more (e.g., based on each active device having a data bandwidth of about 250 Megabytes per second). As illustrated, the drawers 18, 20 may be arranged in a stacking configuration, such that one drawer 18 is disposed on top of the other drawer 20. The active devices 34 can be independently accessible from each drawer 18, 20 when opened. In some embodiments, each drawer 18, 20 may each be able to slide out, like drawer 20 as illustrated in FIG. 3, so that active devices 34 may be accessible via a top side or opening.

In some embodiments, each device frame 32 is mechanically coupled to a slide assembly 36 to facilitate coupling with the chassis housing 16 (e.g., a drawer slide assembly). For example, each device frame 32 may be coupled to one rail of the slide assembly 36, and the chassis housing 16 is coupled to another rail of the slide assembly 36. However, any suitable type of slide assemblies 36 may be used that allows the drawers 18, 20 to be pulled out and pushed in by a user to vary the distance between the drawers 18, 20 and the sub-chassis 22 (e.g., to move the drawers away from and toward the sub-chassis).

The chassis 14 may include a cable assembly 38 coupled between the sub-chassis 22 and at least one drawer 18, 20. In some embodiments, two cable assemblies 38 are included, one mounted to a top-side of the sub-chassis 22 operably coupled to the top drawer 18 and one mounted to the bottom-side of the sub-chassis 22 operably coupled to the bottom drawer 20.

Each cable assembly 38 may be flexible. Each cable assembly 38 may be coiled when the respective drawer 18, 20 is closed. The cable assembly 38 may straighten out as the drawer 18, 20 is opened.

In some embodiments, the height of the cable assembly 38 is limited by the height of the chassis 14. For example, the components of the sub-chassis 22 may be arranged in a stacking configuration, such that a bottom cable assembly 38, a power supply 26, a data controller 28, and a top cable assembly 38 are vertically arranged and together are limited by the height of the chassis 14. Each cable assembly 38 may provide power and/or data connections between the power supplies 26 and/or data controllers 28 and the active devices 34 in the respective drawer 18, 20. Generally, each cable assembly 38 is flexible so that connections may be maintained even as the drawers 18, 20 are opened and closed. In some embodiments, the cable assembly 38 may include only some data connections or only power connections. For example, the cable assembly 38 may be free of high-speed electronic cables or optical cables. Cables may take up an amount of space that is generally proportional to the bandwidth of the cables, so higher bandwidths would require more space for cabling. Cables may also be cumbersome to the design and sliding operation of the drawers 18, 20.

Optical communication may be used between the active devices 34 and the sub-chassis data controllers 28 for the data connection. The number of flexible cables within the cable assembly 38 may be reduced by using optical communication for the data connection. The chassis 14 may be capable of a higher throughput or bandwidth using optical communication for the data connection and more room for greater power delivery via the cable assemblies 38.

Each chassis 14 may include a first optical communication interface 40 (e.g., first interface) and a second optical communication interface 42 (e.g., second interface) that communicates with the first interface 40, which are shown in FIGS. 4-10. The first interface 40 may be coupled to or be included with the sub-chassis 22, and the second interface 42 may be coupled to or be included with one of the drawers 18, 20, or vice versa. Each drawer 18, 20 may be coupled to or include one of the first interfaces 40, 42 and be capable of communication independent of the other drawer. The interfaces 40, 42 may communicate bi-directionally.

In some embodiments, the sub-chassis 22 includes a structure, such as a midplane 44, for operably coupling devices in the sub-chassis 22 for communication and/or power delivery. One of the optical interfaces 40, 42 may be connected to the sub-chassis 22 via the midplane 44.

The interfaces 40, 42 may be optically coupled and communicate via and over a free-space communication channel 46. In this manner, the interfaces 40, 42 can facilitate data communication between the active devices 34 and the data controllers 28 via the interfaces 40, 42 and the free-space communication channel 46. The interfaces 40, 42 are described herein in more detail.

Figure 4A:
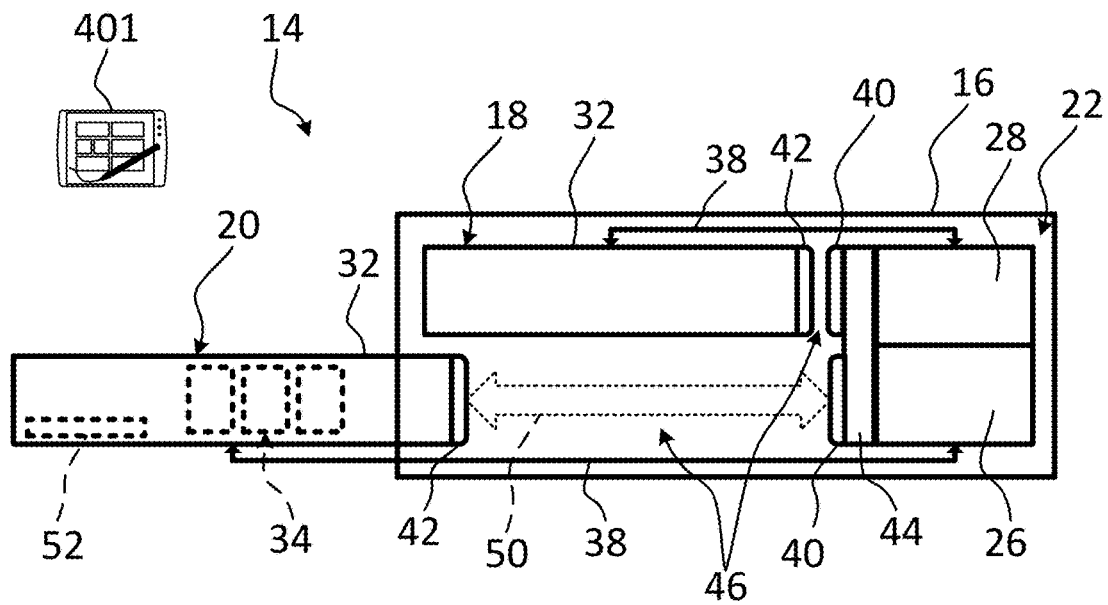
FIG. 4A is a schematic elevation view of an example system including optical interfaces used with the chassis of FIG. 1 showing drawers in various positions.
Figure 4B:
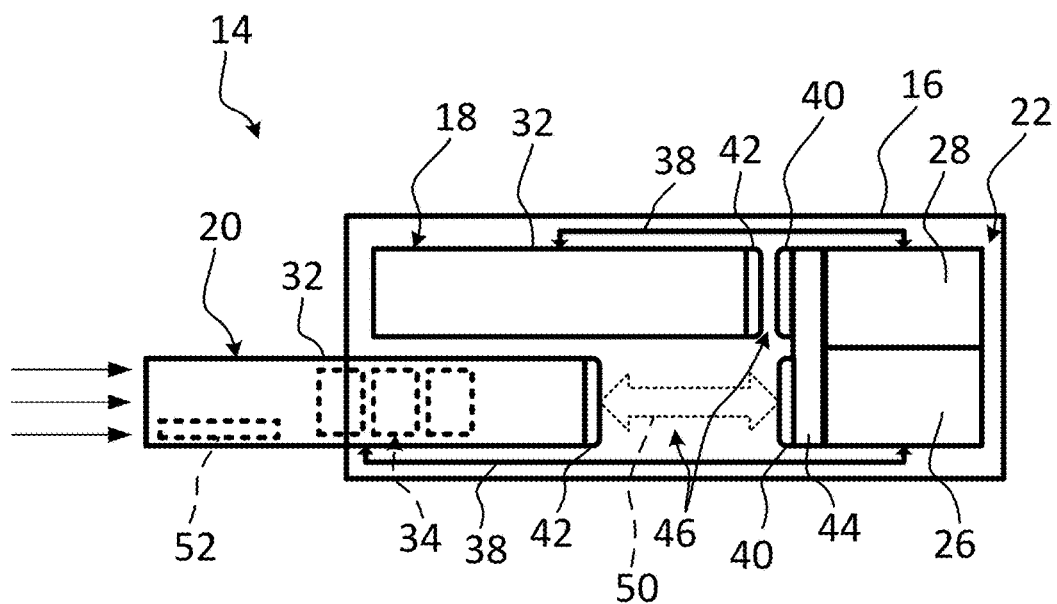
FIG. 4B is a schematic elevation view of the chassis of FIG. 4A with the drawers in other positions.

FIGS. 4A-B show drawers 18, 20 of the chassis 14 in various positions. The drawer 20 is in an open position in FIG. 4A, and the drawer 20 is in an intermediate position in FIG. 4B. In both FIGS. 4A-B, the drawer 18 is shown in a closed position. One or both of the drawers 18, 20 may move among the closed position, the intermediate position, the open position, or any other position between, independent of the other drawer. The interfaces 40, 42 of each drawer 18, 20 can maintain communication between the interfaces at any of these positions.

Each interface 40, 42 is optically coupled to a free-space communication channel 46. The free-space communication channel 46 may be described as extending from one or more components of one interface 40 to one or more components of the other interface 42, or vice versa. The interfaces 40, 42 may be spaced apart by a variable distance 50. The interfaces 40, 42 are capable of communicating via, through, or across the free-space communication channel 46 and the variable distance 50.

The interfaces 40, 42 may face each other at the ends of the free-space communication channel 46. In other words, the interfaces 40, 42 may include one or more components that are directed, or pointed, generally at each other. In some embodiments, each interface 40, 42 defines a surface substantially parallel to the surface of the other interface. The surface may be substantially orthogonal to the direction of the free-space communication channel 46 and/or the variable distance 50 between the interfaces 40, 42.

Each drawer 18, 20 may be associated with a free-space communication channel 46 and a set of interfaces 40, 42. The variable distance 50 between each set of interfaces 40, 42 associated with one drawer 18 may be independent from the other set of interfaces associated with the other drawer 20.

In some embodiments, one or both of the drawers 18, 20 can be moved to an outside position while maintaining communication between the interfaces 40, 42 given that a sufficient optical coupling, or a line of sight, is maintained between the interfaces. In the outside position, the drawer 18, 20 is entirely outside of the housing 16. Communication may be maintained at least a limited distance while the drawer 18, 20 is beyond the housing 16. In some embodiments, the slides coupling the device frame 32 to the housing 16 and/or sub-chassis 22 may be disconnected and/or the cable assembly 38 providing power to the active devices 34 may be disconnected. The disconnected drawer 18, 20 may be placed on an external surface as work is performed on the one or more active devices 34 within the disconnected drawer. One or both of the drawers 18, 20 may include a battery 52 to power the interfaces 40, 42 and the active devices 34 while the cable assembly 38 is disconnected for a limited duration (e.g., several minutes). The interfaces 40, 42 may be coupled to the device frame 32 of one or both drawers 18, 20. The variable distance 50 between the interfaces 40, 42 may change with the position of the particular drawer 18, 20.

In some embodiments, communication between the set of interfaces 40, 42 is continuous while at least one of the drawers 18, 20 is moved (e.g., when using single-input, single-output communication). In some embodiments, as at least one of the drawers 18, 20 is moved, communication between the set of interfaces 40, 42 may be interrupted (e.g., when using multi-input, multi-output communication). The interfaces 40, 42 may be able to detect when the interfaces 40, 42 are once again stationary, or not moving relative to one another, and automatically resume communication therebetween.

The interfaces 40, 42 may communicate with an external device 401, such as a portable optical receiver, smartphone, or tablet. The external device 401 may include an optical source and/or receiver (e.g., infrared LED). The external device 401, or at least the optical components thereof, may be placed into the free-space communication channel 46 to establish communication. One or both interfaces 40, 42 may communicate diagnostic data with the external device 401, for example, in a diagnostic process, which may facilitate data center maintenance. In some embodiments, one or both interfaces 40, 42 may be modulated to transmit diagnostic data related to the data management system 10. The external device 401, which may be handled by an operator, for example, may receive the diagnostic data via the free-space communication channel 46. The external device 401 may comprise a memory storing and a processor for executing one or more programs for receiving and interpreting the diagnostic data. The external device 401 may also communicate to one or both interfaces 40, 42. For example, the external device 401 may transmit electromagnetic energy using single-channel communication (e.g., a single infrared LED), which can be detected by one or both interfaces 40, 42.

Figure 5A:
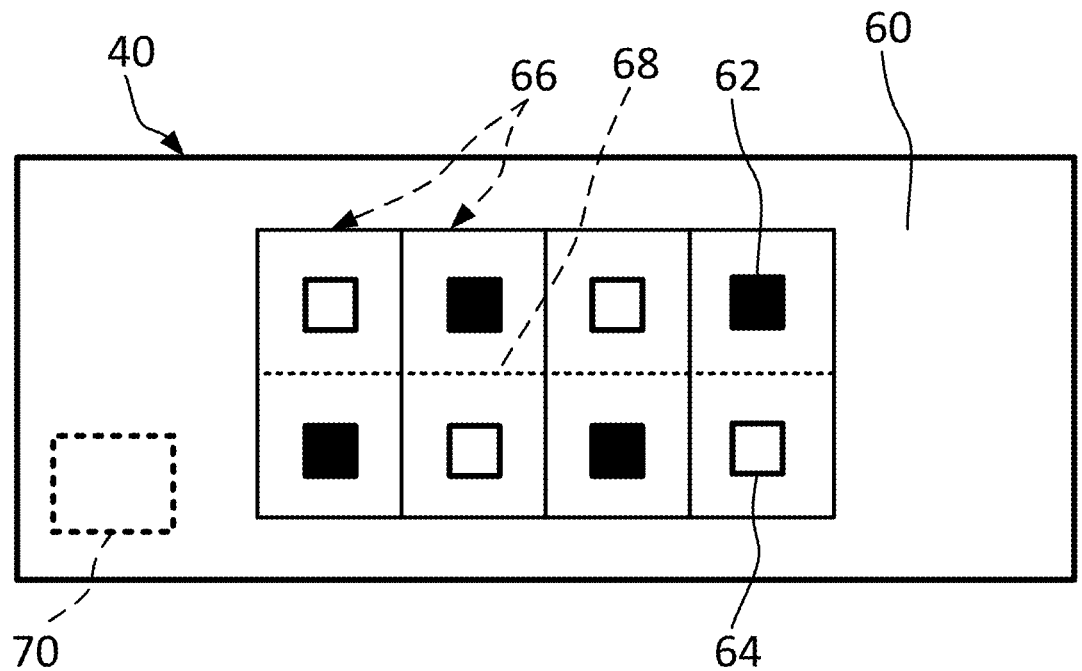
FIG. 5A is a schematic front-facing view of the example first optical interface of FIGS. 4A-4B.
Figure 5B:
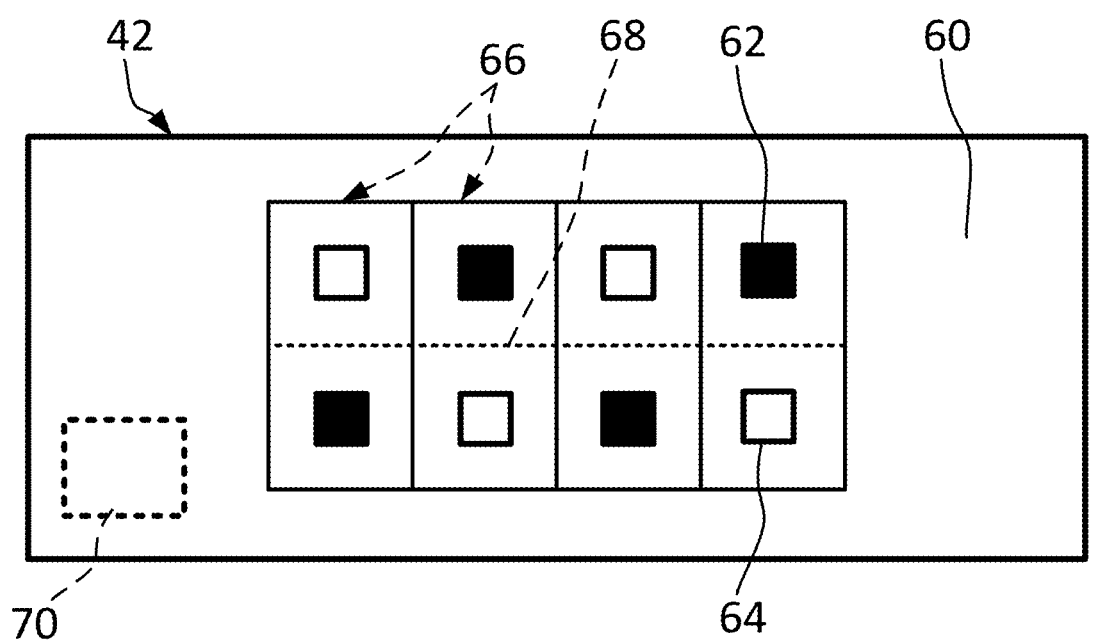
FIG. 5B is a schematic front-facing of the example second optical interface of FIGS. 4A-4B for communication with the first optical interface of FIG. 5A.

FIG. 5A shows a front-facing view of the interface 40 and FIG. 5B shows a front-facing view of the opposing interface 42. Each interface 40, 42 may include a substrate 60 defining a surface. The substrate 60 may define a substantially planar surface. A non-limiting example of a substrate 60 is a printed circuit board.

Each interface 40, 42 may include sources 62 and receivers 64 of electromagnetic energy, which may collectively be described as transceivers. The sources 62 and receivers 64 of each interface 40, 42 may each be coupled to the substrate 60. Each interface 40, 42 may include the same number of sources 62 and receivers 64. Although only four sources 62 and four receivers 64 are shown, any number of sources and receivers may be utilized on each interface 40, 42 while maintaining sufficient spacing between the sources and/or receivers and maintaining sufficient high bandwidth for communication between the interfaces. Sources 62 and receivers 64 may be arranged in a transceiver array on each interface 40, 42 for bi-directional communication. In some embodiments, the sources 62 and receivers 64 are disposed on the substantially planar surface of the substrate 60 to form a substantially planar transceiver array.

Each source 62 in the transceiver array of interface 40 may be aligned to a corresponding receiver 64 in the transceiver array of interface 42, and vice versa, when the interfaces face one another. In the illustrated embodiment, the interfaces 40, 42 define identical transceiver arrays when viewed from the front, which may facilitate alignment in a simple manner.

The sources 62 may each transmit, emit, or provide electromagnetic energy toward the other interface 40, 42 that represents data, which may be received by the receivers 64 of the other interface. The electromagnetic energy may be transmitted in the form of a beam of light (e.g., a ray or a shaft of light). The beam of light may have a divergence angle. The electromagnetic energy may include visible light, non-visible light, or both. In some embodiments, the electromagnetic energy includes only non-visible light. In particular, the electromagnetic energy may include infrared, non-visible light (e.g., at 850 nm).

The sources 62 and receivers 64 on the same substrate 60 are spaced with respect to each other, such that each receiver 64 on an interface 40, 42 can distinguish each of the sources 62 on the other interface. Determining sufficient, or minimum, spacing between sources 62 and/or receivers 64 may be based on at least one of: receiver sensitivity level (e.g., which may further be based on the angle of incidence), source beam divergence angle, source power level, multipath interference, and a characteristic of the transmitted electromagnetic energy (e.g., source beam profile). For example, more sensitive receivers 64 may require less minimum spacing between the sources 62 and/or receivers 64 on the same substrate 60. The spacing of the sources 62 and/or the receivers 64 may be uniform throughout the transceiver array. In some embodiments, the spacing of the sources 62 and/or the spacing of the receivers 64 may not be uniform.

The sources 62 and/or receivers 64 may have uniform characteristics. For example, each source 62 may be specified to have the same power level and/or the receivers 64 may have the same sensitivity level. In some embodiments, the sources 62 and/or the receivers 64 may not have uniform characteristics. For example, the sources 62 may have different divergence angles and/or the receivers 64 may have different sensitivity levels.

One or more transceiver compartments 66 may be included with each interface 40, 42. The transceiver compartment 66 may include one or more walls, or barriers, that extend beyond the transceiver (e.g., toward the other interface) to limit the angle of light transmitted from a source 62 or received by a receiver 64. In some embodiments, the transceiver compartment 66 extends from the surface of the substrate 60 a limited distance to define the angles of light. In the illustrated embodiment, four transceiver compartments 66 are shown on each substrate 60. Each transceiver compartment 66 may be associated with a source 62, a receiver 64, or both. The walls of the transceiver compartment 66 may surround, or encompass, the associated source 62 and/or receiver 64 and define an aperture, or opening, to allow passage of electromagnetic energy. In some embodiments, the transceiver compartment 66 comprises a sub-compartment surrounding either a source 62 or a receiver 64.

One of the walls, or barriers, of each transceiver compartment 66 may be described as a crosstalk suppression divider 68 (represented diagrammatically as a broken line) positioned between a source 62 and a receiver 64. The crosstalk suppression divider 68 may prevent a receiver 64 from receiving light from a source 62 on the same interface 40, 42, which may interfere with communication to the other interface. The transceiver compartments 66 may be uniform or different in shape and size. In some embodiments, the transceiver compartments 66 share one or more walls, such as the crosstalk suppression divider 68.

An interface controller 70 (represented diagrammatically as a broken line) may be included with each of the interfaces 40, 42 operatively coupled to and associated with the sources 62 and receivers 64 of the respective interface. The interface controller 70 may be operatively coupled to each of the corresponding sources 62 and receivers 64 to provide signals for transmission by the sources 62 and to receive signals from the receivers 64. The interface controller 70 may also process signals to facilitate communication over the interfaces 40, 42.

The interface controller 70 may be able to detect that the interfaces 40, 42 are stationary or moving relative to one another. In some embodiments, the interface controller 70 is operatively coupled to a sensor (not shown) to detect movement or lack of movement between the interfaces 40, 42. In some embodiments, the interface controller 70 may interrupt communication when the interfaces 40, 42 are moving relative to one another and may resume communication when the interfaces are stationary. When the interfaces 40, 42 are stationary, the interface controller 70 may recalibrate the interfaces 40, 42.

Each interface controller 70 may include a processor, such as a central processing unit (CPU), computer, logic array, or other device capable of directing data coming into or out of the respective interface 40, 42. In some embodiments, the interface controller 70 includes one or more computing devices having memory, processing, and communication hardware. The functions of the interface controller 70 may be performed by hardware and/or as computer instructions on a non-transient computer readable storage medium.

In some embodiments, the interface controller 70 associated with each interface 40 may be incorporated into or integrated with the one or more data controllers 28 of the sub-chassis 22 (FIGS. 4A-4B). In some embodiments, each interface controller 70 is dedicated for communication between the interfaces 40, 42.

Each source 62 may deliver, or transmit, electromagnetic energy to represent data. For example, "on" may represent a binary 1 and "off" may represent a binary 0 to represent binary data. In some embodiments, other intermediate levels of energy may be used, which may be continuous or discrete. During communication, the source 62 may have a switching rate, or speed. In some embodiments, the switching rate may be constant. The switching rate may correspond to the data transfer rate of the source 62. In particular, the source 62 may have a maximum switching rate that corresponds to its maximum data transfer rate. In some embodiments, the source 62 is a light-emitting diode (LED). The maximum switching rate for an LED may be about 2 Gigahertz (GHz), which may correspond to a maximum data transfer rate of about 4 Gigabits per second (Gb/s). In some embodiments, the source 62 is a laser. A non-limiting example of a laser is a laser diode. One type of laser diode that may be used is a vertical-cavity surface-emitting laser (VCSEL). The maximum switching rate of a laser may be about an order of magnitude, or more, greater than the maximum switching rate of an LED. The maximum switching rate of a laser may be about 20 GHz, about 25 GHz, about 30 GHz, or more, which may correspond to maximum data transfer rate of about 40 Gb/s, about 50 Gb/s, about 60 Gb/s, or more, respectively. The number of sources 62 and corresponding receivers 64 may be based on the desired bandwidth for communication between interfaces 40, 42.

Non-limiting examples of speed sources 62 include surface emitting laser diodes such as Vertical Cavity Surface Emitting Lasers (VCSELs), edge emitting diode lasers such as Distributed Feedback (DFB) lasers, and photonic integrated circuits (PIC), which can also incorporate a variety of complex functions. Such sources can be directly modulated beyond 50 Gb/s. Non-limiting examples of receivers 64 include GaAs photodiodes or Germanium on Silicon, for example, as part of a silicon PIC.

Each receiver 64 can receive electromagnetic energy from one or more sources 62. The receiver 64 may define a wavelength response range, a peak sensitivity wavelength, a sensitivity level, and a maximum switching detection rate. The wavelength response range and the peak sensitivity wavelength may correspond to (e.g., overlap, include, or be coextensive with) characteristics of the electromagnetic energy from the corresponding source 62. The sensitivity level may contribute to determining the minimum spacing between sources 62 and/or receivers 64 on each interface 40, 42. The maximum switching detection rate may be about equal to or greater than the maximum switching rate of the corresponding source 62.

Each additional source 62 included on each of the interfaces 40, 42 may increase the communication bandwidth between the interfaces by a proportional amount. For example, two sources 62 may double the maximum bandwidth compared to one source 62, four sources 62 may quadruple the maximum bandwidth compared to one source 62, and so on. The maximum bandwidth between the interfaces 40, 42 may be limited by the number of sources 62 and receivers 64 that can fit on each interface. In particular, the bandwidth may be limited by the minimum spacing between the sources 62 and/or receivers 64, which may limit the number of transceivers that can fit on each interface. In addition to depending on characteristics of the sources 62 and receivers 64, the maximum bandwidth may also depend on the processing capabilities of the interface controllers 70.

Figure 6:
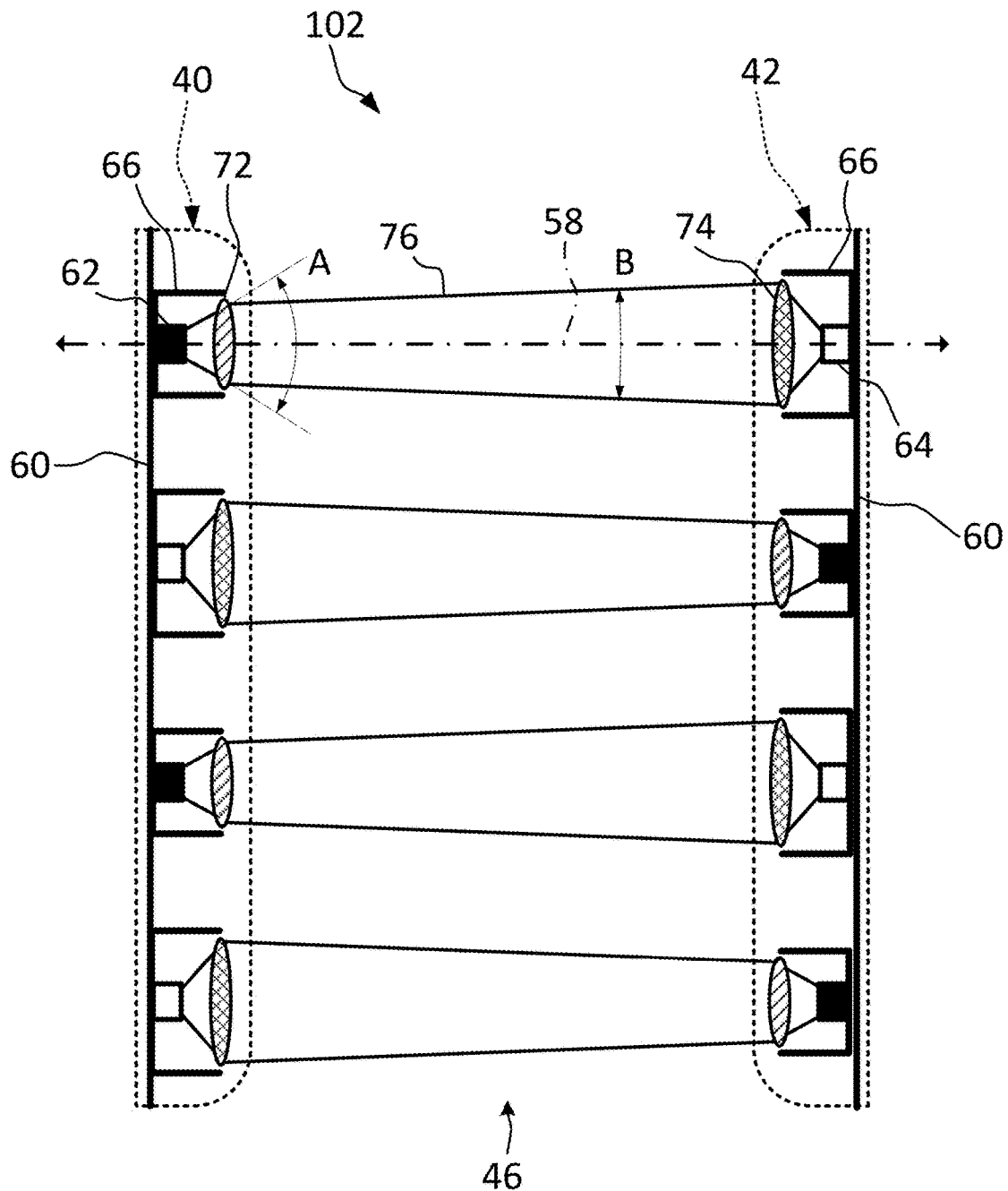
FIG. 6 is a schematic plan view of example optical interfaces including lenses for directing transmitted light across a free-space channel for single-input, single-output communication.

FIG. 6 is a schematic plan view of a single-input, single-output (SISO) communication apparatus 100 using optical interfaces 40, 42 with lenses 72, 74 that each direct transmitted light from one of the sources 62 to one of the receivers 64. In some embodiments, SISO communication defines a "one-to-one" relationship or pairing between sources 62 and receivers 64 on opposite interfaces 40, 42. As shown, a beam 76 of transmitted light leaves the source 62 along axis 58 and has a divergence angle A. The divergence angle A may change or be modified before reaching the corresponding receiver 64. As used herein, "divergence angle" may describe a measurement from one edge of the beam to an opposite edge of the beam. In some embodiments, the divergence angle A may be wide, which may be greater than or equal to: about 20 degrees, about 30 degrees, about 40 degrees, about 90 degrees, about 120 degrees, or greater. In some embodiments, the divergence angle A may be narrow, which may be less than or equal to: about 20 degrees, about 15 degrees, about 10 degrees, about 5 degrees, or less.

The optical interfaces 40, 42 may be described as aligned with each other. For example, each receiver 64 may be aligned to direct a beam 76 of light along or parallel to the axis 58. The lens 72 receives the beam 76 of transmitted light from the source 62 and collimates the beam to a divergence angle B that is less than divergence angle A. In some embodiments, the divergence angle B is zero degrees. In some embodiments, as illustrated, the divergence angle B is greater than zero degrees. In other words, the beam may not be completely or perfectly collimated.

Once collimated, the beam 76 may be described as an expanded beam, which has a greater cross-sectional area than the beam leaving the source 62 but may, e.g., have a smaller divergence angle B. Use of an expanded beam may mitigate interference from dust between the interfaces 40, 42 that enters the free-space communication channel 46.

After traversing the free-space communication channel, the beam 76 may be received by the lens 74. The lens 74 may be a converging lens that reduces the cross-sectional area of the expanded beam 76 for projection onto a sensing area of the receiver 64. In some embodiments, the lens 74 has a larger cross-sectional area or is wider than the lens 72. The larger cross-sectional area may promote misalignment tolerance between the interfaces 40, 42, which may result from, for example, moving one of the interfaces relative to the other interface. In some embodiments, the lenses 72, 74 are sized and aligned to direct most of the beam 76 onto the sensing area of the receiver 64, such as greater than or equal to: about 50% of the beam, about 66% of the beam, about 90% of the beam, about 95% of the beam, or more being directed onto the sensing area.

Each of the sources 62 and the receivers 64 may be associated with one transceiver compartment 66. Each transceiver compartment 66 may be coupled to one of the substrates 60. In some embodiments, the transceiver compartments 66 may be spaced apart and may not share a wall with an adjacent transceiver compartment. In some embodiments, the transceiver compartments 66 associated with the receivers 64 each define, or have, a larger opening than the transceiver compartments associated with the sources 62. The larger opening may accommodate the larger cross-sectional area or diameter of the lens 74 and/or collecting light at greater angles. The size of one or more lenses 72, 74 may be increased to improve misalignment tolerance, particularly for longer variable distances between the interfaces 40, 42.

In this manner, each source 62 of one of the interfaces 40, 42 may be aligned to transmit electromagnetic energy to one corresponding receiver 64 of the other interface 40, 42 for single-input, single-output communication.

Figure 7:
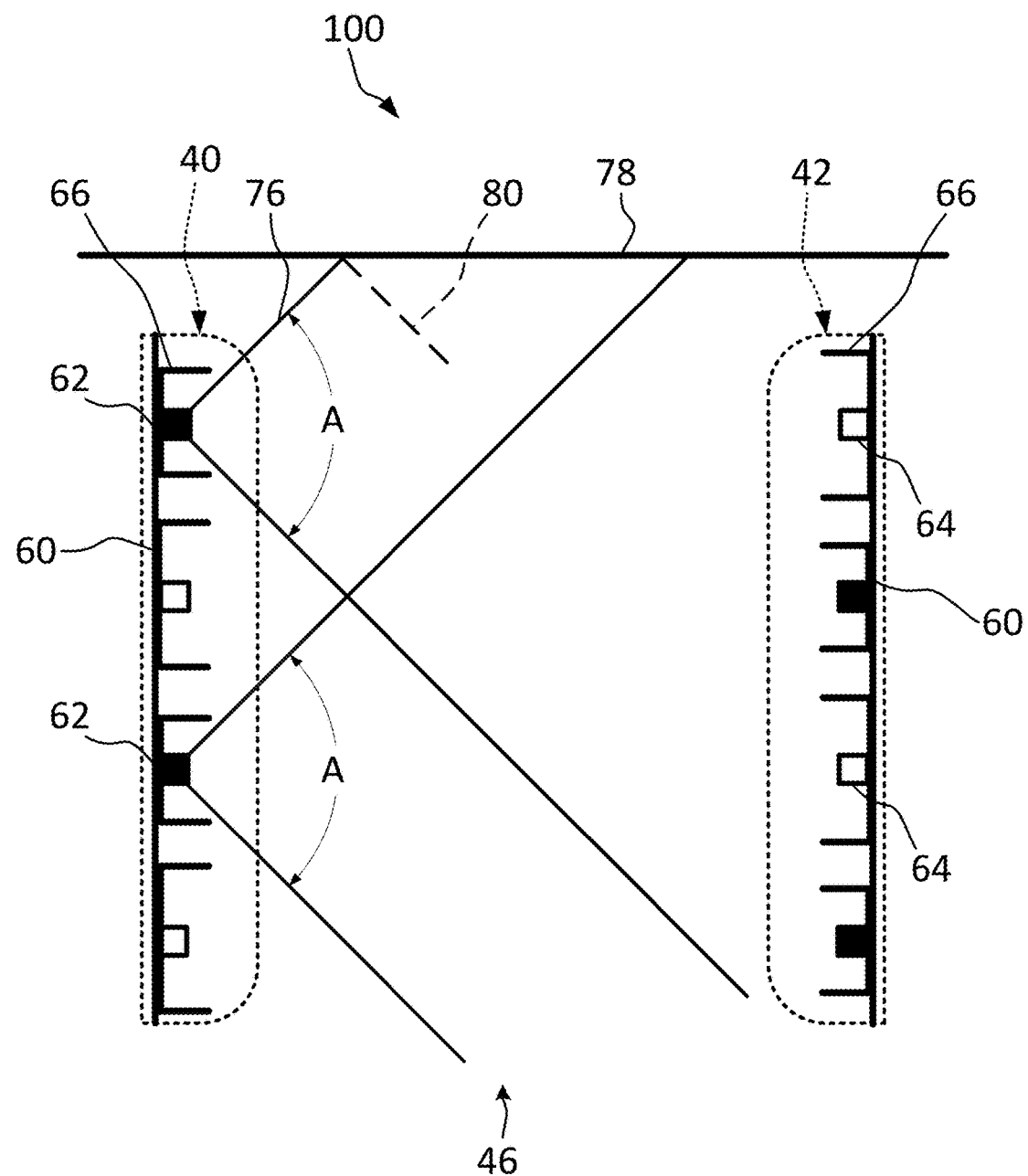
FIG. 7 is a schematic plan view of example optical interfaces including light sources for transmitting light across a free-space channel without lenses for multi-input, multi-output communication.

FIG. 7 is a schematic plan view of a multi-input, multi-output (MIMO) communication apparatus 102 using optical interfaces 40, 42 with sources 62. Many of the parts and components depicted in FIG. 7 are the same or similar to those depicted in, and described with regard to, FIG. 6. Reference is made to the discussion above regarding FIG. 6 for numbered elements depicted in, but not specifically discussed with regard to, FIG. 7. Apparatus 102 differs from apparatus 100 in that the interfaces 40, 42 and the free-space communication channel 46 are free of any lens (e.g., lensless). In other words, there is no lens (e.g., lens 72 or lens 74 spaced apart from the transceivers) in the path of the beam 76 after the beam leaves the source 62 and before the beam reaches the receiver 64. In some embodiments, the beam 76 is not collimated and/or converged before reaching one of the receivers 64 (e.g., between the source 62 and the receiver 64).

Only beams 76 from the sources 62 of interface 40 are shown for illustrative purposes. The sources 62 of interface 42 may concurrently provide beams 76, in particular, to facilitate bi-directional communication between the interfaces 40, 42.

In some embodiments, the beam 76 from each source 62 is directed to more than one receiver 64. In other words, the receivers 64 may receive transmitted light concurrently from multiple sources 62. As more receivers 64 receive at least a portion of the beam 76 from each source 62, the misalignment tolerance between the interfaces 40, 42 may improve. In some embodiments, each beam 76 from a source 62 is received by as many receivers 64 as possible, which may facilitate robust MIMO communication. For example, each receiver 64 may receive a portion of two or more beams 76, three or more beams, four or more beams, five or more beams, ten or more beams, or more. In some embodiments, each receiver 64 receives a portion of all of the beams 76.

Each source 62 may be an LED. In some embodiments, the beam 76 leaving each LED source 62 may be configured to emit, or produce, electromagnetic energy (e.g., light) defining a divergence angle A that may be described as being wide (e.g., as described herein). The divergence angle A may be the same for all of the sources 62. In some embodiments, the divergence angle A may be different for one or more of the sources 62.

Some of the beams 76 may be directed toward a surface 78 of the chassis 14 (FIGS. 4A-4B). In some embodiments, the surface 78 may be at least partially reflective and a portion of the incident beam 76 may be reflected as beam 80. The beam 80 may reach one or more receivers 64 and may be described as contributing to multipath interference. The interfaces 40, 42 may be capable of bi-directional communication with an acceptable level of multipath interference.

Multipath interference may be reduced by modifying the surface 78. In some embodiments, the surface 78 is not reflective or is substantially non-reflective. The surface 78, for example, may include a paint coating that absorbs all or most of the incident light, particularly within the wavelength response range and at the peak sensitivity wavelength of the receivers 64.

Figure 9:
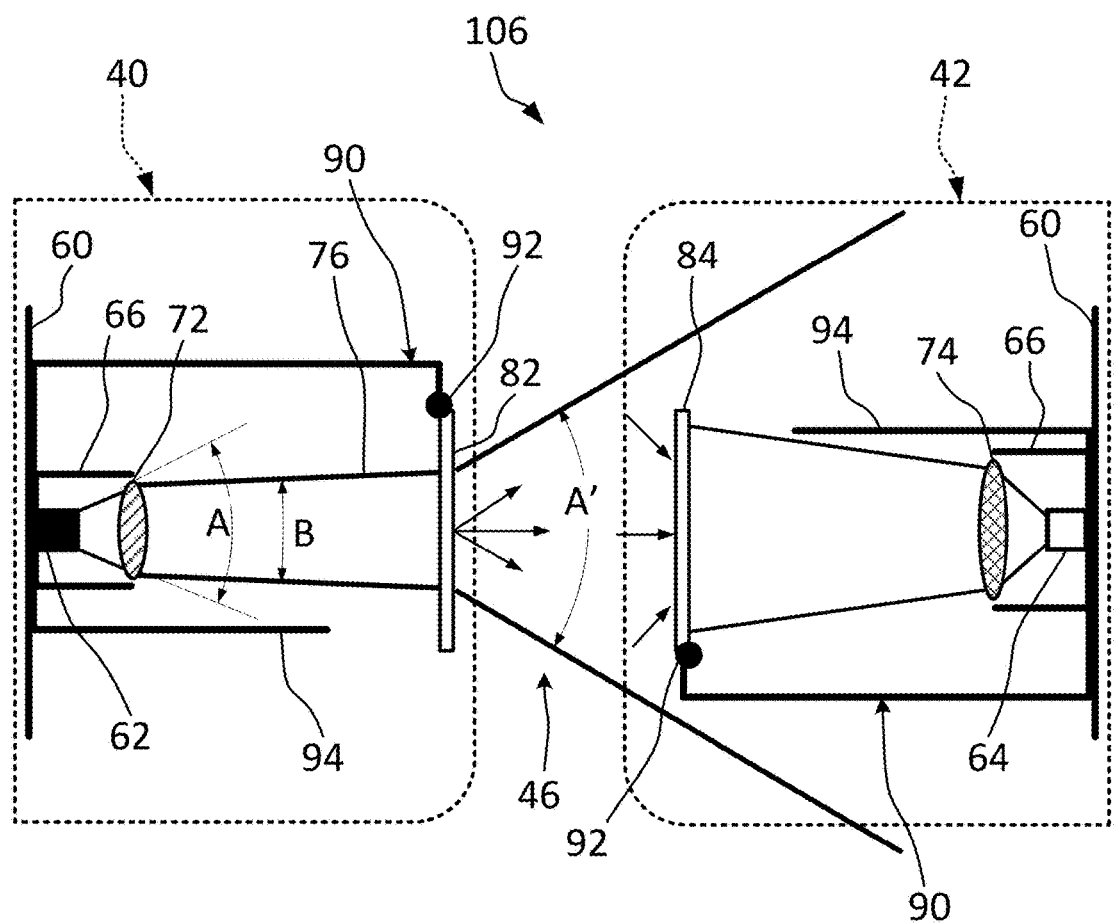
FIG. 9 is a schematic view of example optical interfaces including shutters for spreading transmitted light to communicate across a free-space communication channel at a first distance.

The interfaces 40, 42 are capable of multi-input, multi-output communication processing to determine the data being communicated by the sources 62 described herein in more detail (see FIG. 9).

Figure 8:
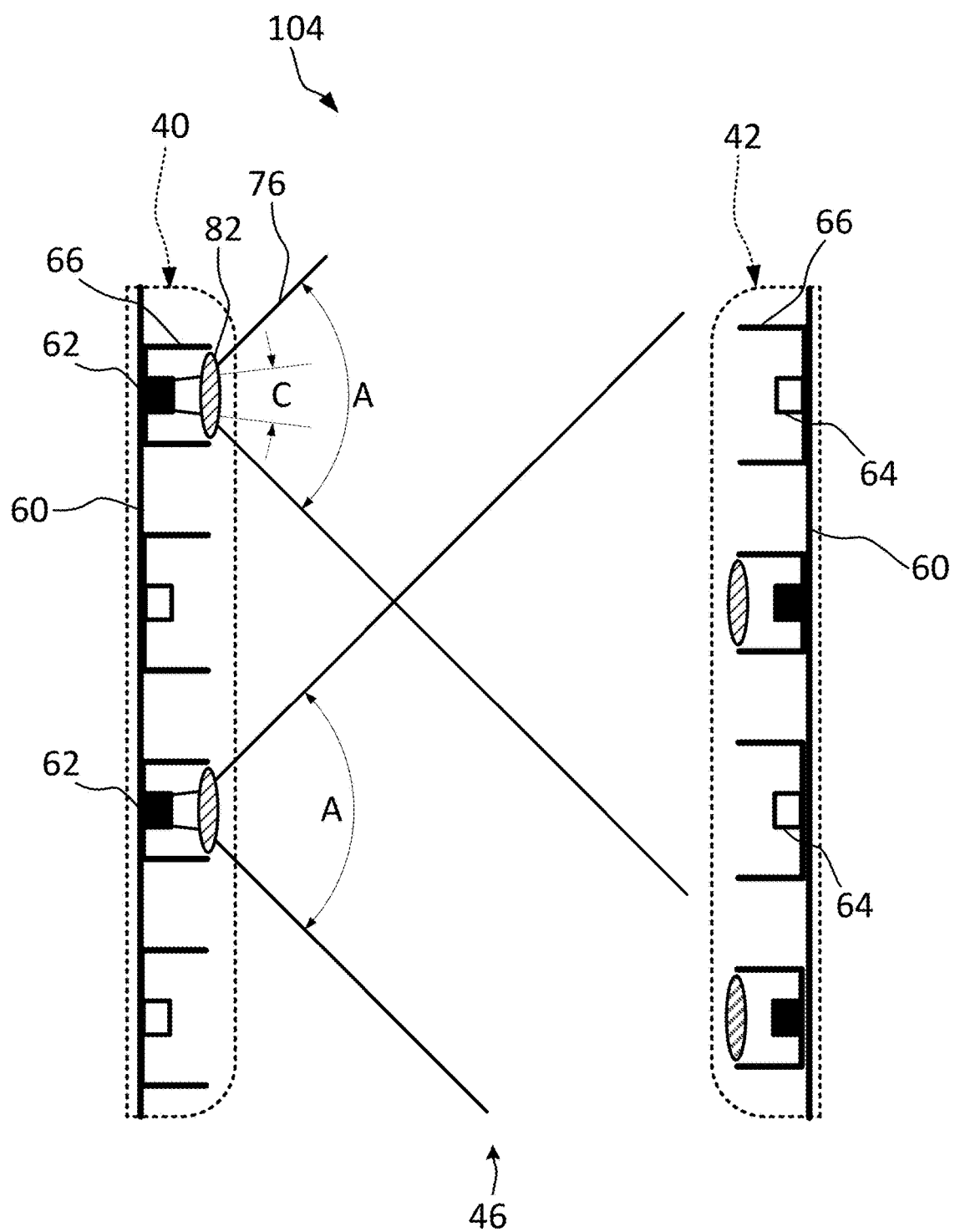
FIG. 8 is a schematic plan view of example optical interfaces including an optical component for spreading transmitted light to communicate across a free-space channel for multi-input, multi-output communication.

FIG. 8 is a schematic plan view of a multi-input, multi-output (MIMO) communication apparatus 104 using optical interfaces 40, 42 with sources 62 and optical components 82. Many of the parts and components depicted in FIG. 8 are the same or similar to those depicted in, and described with regard to, FIGS. 6 and 7. Reference is made to the discussion above regarding FIGS. 6 and 7 for numbered elements depicted in, but not specifically discussed with regard to, FIG. 8. Apparatus 104 differs from apparatus 100 and apparatus 102 in that the beam 76 of transmitted light leaving the sources 62 have a divergence angle C that is narrower than divergence angle A (FIGS. 6 and 7). In some embodiments, each source 62 is a laser (e.g., VCSEL). Once the beam 76 is received by the optical component 82, the beam 76 is spread and defines a divergence angle A that is greater than divergence angle C. In some embodiments, the divergence angle C is narrow (e.g., as described herein) and the divergence angle A is wide (e.g., as described herein).

Although the apparatus 104 uses optical components 82 that are not used in apparatus 102, the use of lasers as sources 62 may allow the apparatus 104 to reach higher bandwidths based on the higher switching speeds of lasers as compared to LEDs.

Only beams 76 from the sources 62 of interface 40 are shown for illustrative purposes. The sources 62 of interface 42 may concurrently provide beams 76, in particular, to facilitate bi-directional communication between the interfaces 40, 42.

The optical component 82 may be any suitable optic structure capable of spreading a beam 76 of transmitted light. In other words, the optical component 82 may be one or more devices or structures configured to increase the divergence angle of the received beam 76 of light. Non-limiting examples of an optical component 82 include a beam spreading lens (e.g., expanding or concave lens) or a curved diffusing screen.

Although not shown here, the interfaces 40, 42 may include lenses 74 (see FIG. 6). The lenses 74 may be associated with each of the receivers 64 and each may converge incident light onto a sensing area of the receivers 64.

Figure 10:
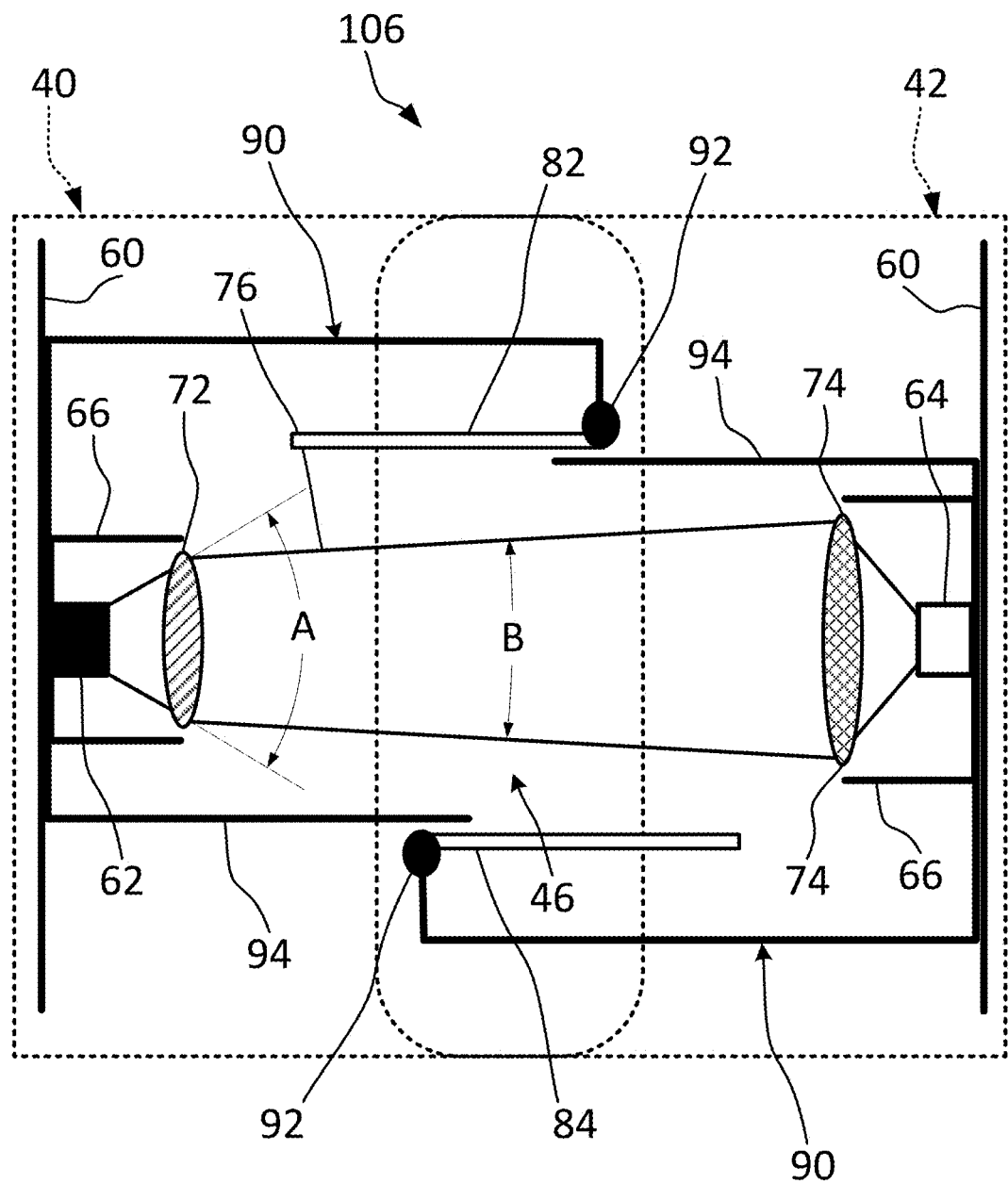
FIG. 10 is a schematic view of the example optical interfaces of FIG. 9 shown at a second distance.

FIGS. 9 and 10 show a MIMO-SISO switching communication apparatus 106 having shutters 90 each associated with a source 62 or a receiver 64 for modifying a beam 76 of transmitted light. Many of the parts and components depicted in FIGS. 9 and 10 are the same or similar to those depicted in, and described with regard to, FIGS. 6-8. Reference is made to the discussion above regarding FIGS. 6-8 for numbered elements depicted in, but not specifically discussed with regard to, FIGS. 9 and 10. Apparatus 106 differs from apparatus 100, apparatus 102, and apparatus 104 in that apparatus 106 can switch between MIMO and SISO communication. In some embodiments, apparatus 106 switches between MIMO and SISO based on, or in response to, the distance between the interfaces 40, 42.

The apparatus 106 can move from a first position shown in FIG. 9 to a second position shown in FIG. 10. In the first position of the apparatus 106 shown in FIG. 9, the shutter 90 associated with the source 62 includes an optical component 82, which is positioned to receive the beam 76 of transmitted light from the source 62. Before reaching the shutter 90, the beam 76 may leave the source 62 at a divergence angle A and be received at a lens 72 that narrows the beam 76 to divergence angle B. In some embodiments, the divergence angle A is wide (e.g., as described herein) and/or the source 62 is an LED. In some embodiments, the divergence angle A is narrow (e.g., as described herein) and/or the source 62 is a laser. In some embodiments, the lens 72 may not be included, for example, when the divergence angle A is sufficiently narrow such that the beam 76 with divergence angle A is completely or almost completely collectable by the optical component 82.

In the illustrated embodiment, optical components 82, 84 are shown schematically. The optical component 82 receives the beam 76 and spreads the beam to a divergence angle A'. In some embodiments, the divergence angle A' is wide. The divergence angle A' may be wider than divergence angle B and/or the same or different than a wide divergence angle A (e.g., the divergence angle prior to the lens 72). Although only one source 62 and receiver 64 are shown, each interface 40, 42 may include multiple sources 62 and receivers 64. In some embodiments, after being modified by the optical component 82, the beam 76 reaches multiple receivers 64 for MIMO communication, particularly when the divergence angle A' is wide. The beam 76 crosses the free-space communication channel 46 and, before reaching one of the receivers 64, each beam 76 may be received by optical component 84 and lens 74 associated with a receiver 64. Each optical component 84 collects light into a beam 76 that converges toward the receiver 64. In some embodiments, each optical component 84 is an expanding lens. Each lens 74 converges the beam 76 further and directs the beam onto the sensing area on the corresponding receiver 64. The optical component 84 may allow more light to be collected and directed toward the receiver 64, particularly due to the presence of the shutter 90, which may otherwise block light at greater incidence angles from reaching the receiver 64. One or both optical components 82, 84 may be concave lenses. Optical component 82 may be a diffusing screen.

The first position shown in FIG. 9 may correspond to a first distance between the interfaces 40, 42. The second position shown in FIG. 10 may correspond to a second distance between the interfaces 40, 42 that is less than the first distance. As the apparatus 106 moves from the first position to the second position, the optical components 82, 84 are moved clear of the beam 76 (e.g., to not receive the beam between the source 62 and the receiver 64). Each shutter 90 may include a linkage 92. Each linkage 92 may mechanically couple one of the optical components 82, 84 to one of the substrates 60 of the respective interface 40, 42. In some embodiments, the linkage 92 is a hinge. Each shutter 90 may include a strut 94. Each strut 94 may facilitate moving one of the optical components 82, 84 clear of the beam 76. In some embodiments, each strut 94 of an interface 40, 42 engages one of the optical components 82, 84 associated with the other interface 40, 42 to urge the optical component to move when the interfaces 40, 42 are moved with respect to each other to the second position. In some embodiments, the strut 94 urges the optical component 82, 84 to pivot about the linkage 92 (e.g., hinge). The optical component 82, 84 in the second position of the apparatus 106 may be disposed perpendicular to their respective orientations in the first position.

In the second position of the apparatus 106 shown in FIG. 10, the optical components 82, 84 are clear of at least a portion, or region, of the beam 76. The interfaces 40, 42 may be described as overlapping due to the engagement of the struts 94 with optical components 82, 84. The beam 76 of transmitted light leaving the lens 72 may cross the free-space communication channel 46 and be received by the lens 74. In some embodiments, each receiver 64 receives transmitted light from only one source 62. In some embodiments, the apparatus 106 in the second position operates similar to apparatus 100. In particular, the interfaces 40, 42 may use SISO communication with a "one-to-one" relationship, or pairing, between sources 62 and receivers 64.

Upon moving the apparatus 106 from the second position back to the first position, each linkage 92 may bias one of the optical components 82, 84 into the path of the beam 76 (e.g., to receive the beam between the source 62 and the receiver 64). In particular, once the strut 94 is clear of engaging one of the optical components 82, 84, the bias of the linkage 92 may freely move the respective optical component into position to receive, or intercept, the beam 76.

Figure 11:
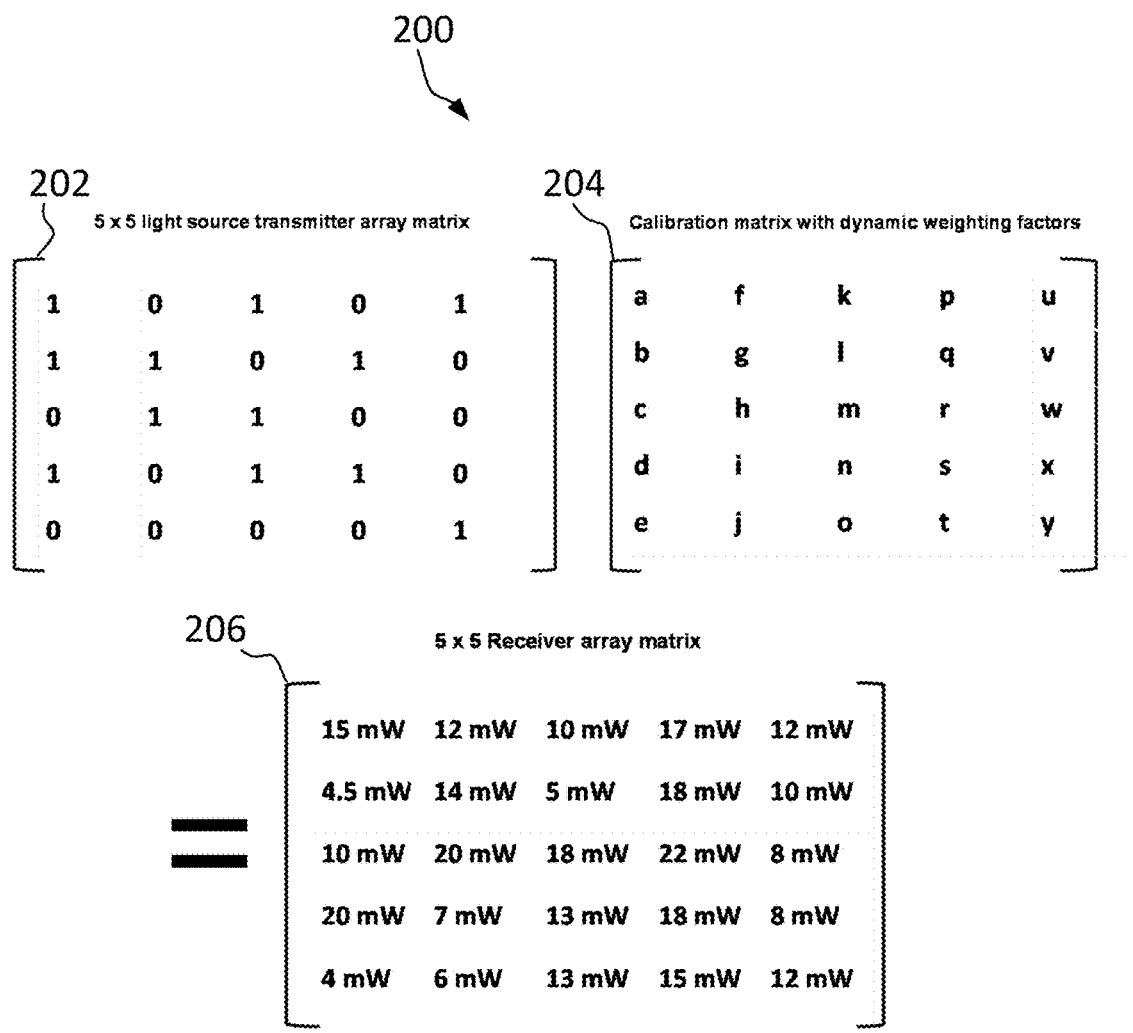
FIG. 11 is a schematic representation of a scheme utilizing matrix multiplication for use with multi-input, multi-output optical communication.

FIG. 11 is a schematic representation of a scheme 200 utilizing matrix multiplication for use in MIMO optical communication processing. The scheme 200 describes a relationship between a source array matrix 202, a calibration matrix 204, and a receiver array matrix 206. In some embodiments, multiplying the source array matrix 202 and the calibration matrix 204 equals the receiver array matrix 206. The scheme 200 can be used to solve for one or more unknown values in one or more of the matrices 202, 204, 206.

Before starting or resuming MIMO communication between interfaces, each interface may be calibrated for bi-directional communication. For example, the values in the calibration matrix 204 may be unknown and calibrating will solve for the unknown values, which may be based on multiple permutations of the values of the source array matrix 202.

During MIMO communication between interfaces, each interface may determine the likely values for the source array matrix 202 based on measured values of the receiver array matrix 206. For example, the values in the receiver array matrix 206 may be unknown and calibrating will solve for the unknown values, which may be based on the known values of the calibration matrix 204 determined during calibration.

The interfaces may be calibrated once the interfaces are stationary relative to one another. In some embodiments, each time an interface is moved relative to another interface, the interfaces may be recalibrated (e.g., calibrated again). The calibration process may interrupt MIMO communication between the interfaces. Once calibration is complete, the interfaces may begin or resume bi-directional MIMO communication based on the determined calibration matrix 204.

The sources on each interface may each be represented by a value in the source array matrix 202. In the illustrated embodiment, there are 25 values in the 5×5 source array matrix 202. In some embodiments, the sources may be arranged on the surface of the respective interface in the same physical relationship as values of the source array matrix 202, for example, a 5×5 array of sources may correspond to each of the values in the 5×5 source array matrix.

The receivers on each interface may each be represented by a value in the receiver array matrix 206. In the illustrated embodiment, there are 25 values in the 5×5 receiver array matrix 206. In some embodiments, the receivers may be arranged on the surface of the respective interface in the same physical relationship as the values of the receiver array matrix 206, for example, a 5×5 array of receivers may correspond to each of the values in the 5×5 receiver array matrix.

In some embodiments, the values in the source and receiver array matrices 202, 206 may be arranged to represent the sources and receivers as they are viewed in the same direction (e.g., along an axis). In other words, the values of the sources may be arranged as if viewing the respective interface in a front-facing view, and the values of the sources may be arranged as if viewing the respective interface in a rear-facing view, or vice versa. In some embodiments, the values may be arranged in a different order, such as a mirrored or other arrangement.

The source array matrix 202 may have a source array state represented by the collective values of the source array matrix. Each source array state may represent one permutation of values for the sources of the interface. In some embodiments, the values may be on and off states, and the values are two discrete states (e.g., binary digits, 1's and 0's). In some embodiments, the values have three or more discrete levels. Increasing the number of levels increase the bandwidth of the communication system, particularly for the same switching, or modulation, rate of the sources. For example, a PAM4 protocol (e.g., four discrete amplitude levels) or other PAM-n protocols (e.g., where n is the number of levels) may be used to double the bandwidth of the communication system. In some embodiments, the values are analog (e.g., continuous), which may be detected as a range of discrete values, for example, by the receiver.

In the illustrated embodiment, one example source array state is shown. If a 1 value were changed to a 0 value, the source array matrix 202 would represent a different permutation of the source array state. In some embodiments, the calibration of the interfaces may include using multiple or all source array states (e.g., all permutations of the source array matrix 202).

During calibration, each source array state may represent the collective states of the sources on the interface being either on or off. The transmitted light from the sources may be received by the receivers on the other, opposing interface. The incident light on the receivers may be measured and represented in the receiver array matrix 206 as a set of values. In some embodiments, the values of the receiver array matrix 206 are decimal digits. In particular, the digits represent power values indicating the intensity of received light or other indicator of light energy received.

For each source array state and corresponding set of measured power values, the values of a calibration matrix 204 may be determined (e.g., solved for) by the receiving interface. The source array state may be unknown to the receiving interface. In some embodiments, the order and timing of source array states may be predetermined and stored, for example, in the memory of the interface controller 70 of each receiving interface, which may allow the receiving interface to correspond each set of measured power values to a predetermined source array state.

The number of values in the calibration matrix 204 (e.g., rows and columns) depends on the size of the matrices 202, 206. In the illustrated embodiment, the calibration matrix 204 is a 5×5 matrix. The values of the calibration matrix 204 may be described as weighting factors. Collectively, the weighting factors in the calibration matrix 204 represent a transformation from the source array state of the source array matrix 202 to the measured power values of the receiver array matrix 206. The calibration matrix 204 may be recalculated and/or revised using multiple source array states and stored, for example, in memory in the interface controller 70 (FIG. 5). In particular, the values of the calibration matrix 204 may be stored in a lookup table. In some embodiments, the calibration matrix 204 is populated according to all the permutations of the source array matrix 202. The values of the calibration matrix 204 are recalculated and/or revised until the values of the receiver array matrix 206 can be predicted for each permutation of the source array matrix 202.

In some embodiments, the movement of the interfaces is detected (e.g., via a sensor) and the calibration process begins. In some embodiments, one or more training sequences involving one or more permutations of the source array matrix 202 and corresponding values of the receiver array matrix may be implemented during calibration until the values of the calibration matrix 204 are stabilized. When the values of the calibration matrix 204 are stabilized, this may indicate that the interfaces are stationary and ready for MIMO communication. To be stabilized may require the values to vary less than about 10%, less than about 5%, less than about 1%, or less over a limited duration, such as 2 seconds, 1 second, 0.5 seconds, 0.1 seconds, or less. Alternatively, or additionally, the end of calibrating may be signaled to the transmitting interface by the receiving interface, for example, using an optical signal from one of the sources or another light source. Each interface may be independently calibrated and have its own calibration matrix 204 stored.

Once the calibration matrix 204 is determined and calibration is complete, bi-directional MIMO communication may be started or resumed. During operation, each interface may provide transmitted light represented by the source array matrix 202 as a source array state, for example, during a clock cycle. The incident light may be measured by the corresponding receivers on the opposing, receiving interface represented by the receiver array matrix 206. Although the source array state is unknown to the receiving interface, the source array state may be determined, or estimated, based on the measured incident light and the calibration matrix.

In some embodiments, determining the source array state may involve multiplying the measured power values of the receiver array matrix 206 by an inverse of the determined calibration matrix 204, which may have been stored in memory in the interface controller 70 (FIG. 5). The resulting matrix product may represent the intended source array state (e.g., the data or information that the transmitting interface intended to communicate to the receiving interface for that particular clock cycle).

Each interface may transmit data or information independently of the other interface. In some embodiments, the data or information is transmitted by each interface using the same clock cycle. In some embodiments, each interface may have the same clock cycle frequency but have staggered clock cycles.

The scheme 200 may describe functionality carried out by each of the interface controllers 70 (FIG. 5). In some embodiments, the interface controller 70 may be capable of processing MIMO communication about as fast, or faster than, the bandwidth of the sources and/or receivers.

Figure 12:
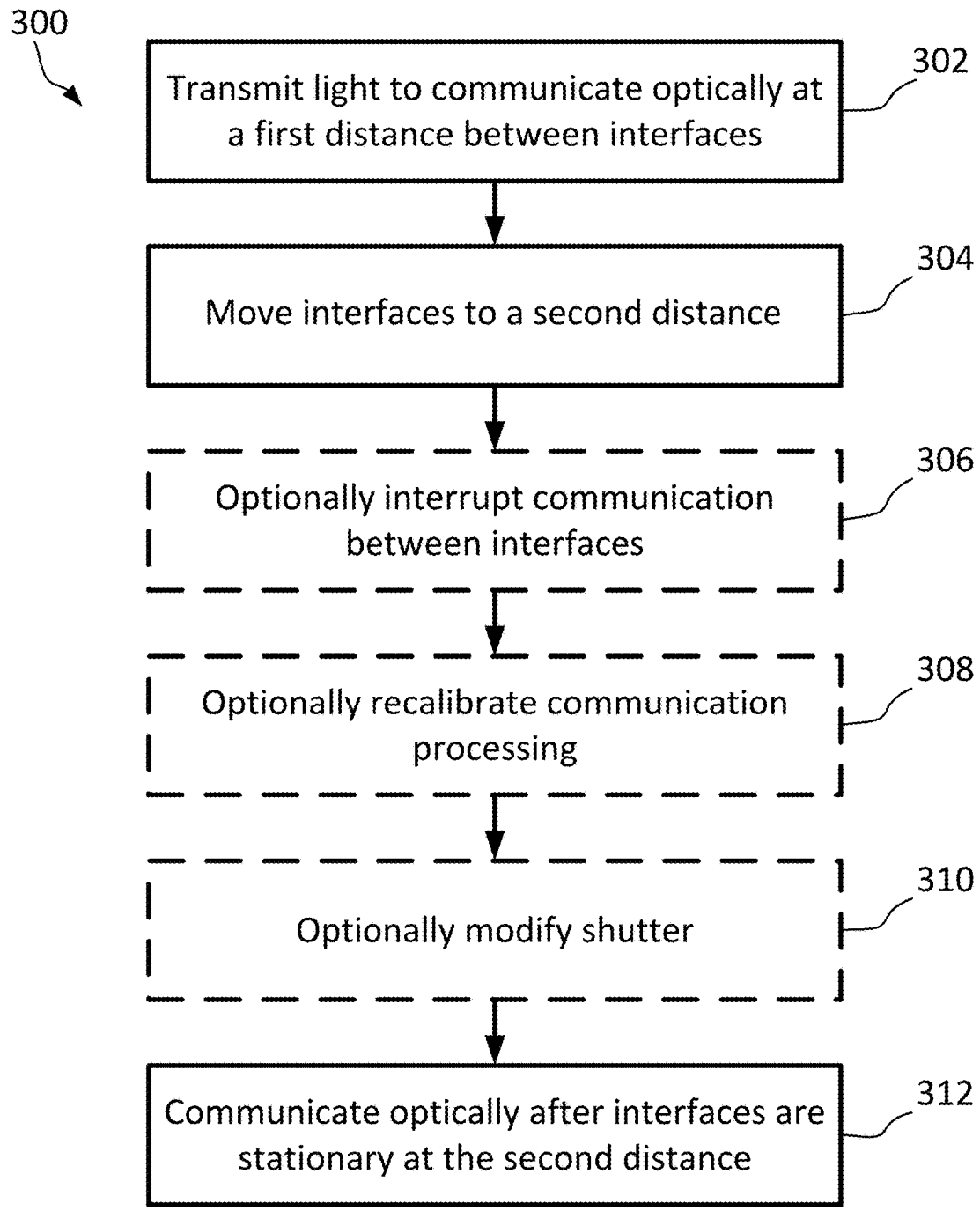
FIG. 12 is a block diagram of a method of using the example optical interfaces.

FIG. 12 is a schematic representation of method 300 for using interfaces described herein. In process 302, light is transmitted to communicate optically at a first distance between interfaces. In process 304, at least one of the interfaces moves toward a position to define a second distance between the interfaces. In optional process 306, communication between the interfaces may be interrupted, for example, if the interfaces are communicating using MIMO processing. Communication may not be interrupted, for example, if the interfaces are communicating using SISO. In optional process 308, the communication process for the interfaces is recalibrated. For example, a calibration matrix and/or a lookup table may be recalculated. In optional process 310, a shutter is modified. The shutter may be modified between states that do and do not influence the transmitted light. For example, the shutter may move out of the path of the transmitted light between interfaces as the second distance is approached. The second distance may be shorter than the first distance. Part of the interfaces may physically engage at the second distance, which may modify the beam of electromagnetic energy between the interfaces. In process 312, the interfaces are stationary and communicate optically at the second distance.

Thus, embodiments of the OPTICAL DATA COMMUNICATION OVER VARIABLE DISTANCES are disclosed. Although reference is made to the accompanying set of drawings that form a part hereof and in which are shown by way of illustration several specific embodiments, it is to be understood that other embodiments are contemplated and may be made without departing from (e.g., still falling within) the scope or spirit of the present disclosure. The detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements).

Terms related to orientation, such as "top", "bottom", "side", and "end", are used to describe relative positions of components and are not meant to limit the orientation of the embodiments contemplated. For example, an embodiment described as have a component on a "top" of another component also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The term "and/or" means one or all of the listed elements or a combination of any two or more of the listed elements (e.g., casting and/or treating an alloy means casting, treating, or both casting and treating the alloy).

The phrases "at least one of," "comprises at least one of," and "one or more of" followed by a list refers to any one of the items in the list and any combination of two or more items in the list.

What is claimed is:

1. A system comprising:
    a first optical communication interface coupled to a sub-chassis;
    a free-space communication channel optically coupled to the first optical communication interface; and
    a second optical communication interface coupled to a device frame, the device frame movably coupled to the sub-chassis, the second optical communication interface optically coupled to the first optical communication interface via the channel to bi-directionally communicate across a variable distance between the interfaces.

2. The system according to claim 1, wherein each interface comprises:
    an optical source to transmit electromagnetic energy via the channel; and
    an optical receiver optically aligned with the source to receive the transmitted electromagnetic energy via the channel.

3. The system according to claim 2, wherein each interface further comprises a collimating lens to receive and collimate electromagnetic energy from the source to be transmitted via the free-space communication channel.

4. The system according to claim 2, the electromagnetic energy transmitted by the source does not pass through an intervening lens before reaching the receiver.

5. The system according to claim 1, wherein each interface comprises optical sources and optical receivers, the receivers of one interface being configured to receive transmitted light concurrently from multiple optical sources from the other interface to bi-directionally communicate with multi-input, multi-output processing.

6. The system according to claim 5, wherein at least one of the sources comprises a light-emitting diode to transmit electromagnetic energy and define a divergence angle greater than 20 degrees.

7. The system according to claim 5, wherein at least one of the sources comprises:
a laser to transmit a beam of electromagnetic energy; and
an optical component to receive and spread the beam to define a divergence angle greater than 20 degrees.

8. The system according to claim 1, wherein the interfaces communicate continuously while the second optical communication interface moves relative to the first optical communication interface.

9. The system according to claim 1, wherein each interface comprises a controller to interrupt communication between the interfaces in response to detection of movement of the second optical communication interface relative to the first optical communication interface.

10. The system according to claim 1, wherein each interface comprises a controller to recalibrate communication between the interfaces in response to detection of interfaces that are relatively stationary to one another.

11. The system according to claim 1, wherein the device frame comprises a battery to power the second optical communication interface while the device frame is disconnected from a power supply in the sub-chassis.

12. The system according to claim 1, further comprising a power supply coupled to the sub-chassis via a flexible cable assembly.

13. An apparatus comprising:
a first optical communication interface; and
a second optical communication interface, the interfaces defining a free-space communication channel therebetween, each interface comprising an optical source of electromagnetic energy and an optical receiver of electromagnetic energy to bi-directionally communicate with the other interface over at least two different distances via the channel using multi-input, multi-output processing configured by a calibration matrix at each distance, the calibration matrix comprising weighting factors, each interface configured to determine the weighting factors of the calibration matrix in response to detection of the interfaces being relatively stationary to one another.

14. The apparatus according to claim 13, wherein each interface determines a source array state based on an inverse of the calibration matrix and receiver array power values.

15. The apparatus according to claim 14, wherein each interface calculates weighting factors of the calibration matrix based on multiple known source array states and corresponding received electromagnetic power values.

16. A system comprising:
a first optical communication interface;
a second optical communication interface spaced at variable distances from the first optical communication interface, the variable distances comprising at least a first distance and a different second distance; and
a shutter positioned to receive a beam of electromagnetic energy sourced by one of the interfaces in response to the interfaces spaced by the first distance and positioned clear of the beam in response to the interfaces spaced by the second distance.

17. The system according to claim 16, wherein the shutter comprises a diffuser, each interface comprises light-emitting diodes, and each interface is configured to communicate with multi-input, multi-output processing when spaced by the first distance and to communicate without multi-input, multi-output processing when spaced by the second distance.

18. The system according to claim 17, wherein the second distance is less than the first distance.

19. The system of claim 16, wherein each interface comprises lasers to transmit beams of electromagnetic energy each associated with an optical component to receive and spread each beam.

* * * * *